United States Patent
Park et al.

(10) Patent No.: US 10,448,207 B2
(45) Date of Patent: Oct. 15, 2019

(54) METHODS, APPARATUSES, SYSTEMS, AND COMPUTER READABLE MEDIA FOR PROVIDING WIRELESS LOCATION SERVICE USING AT LEAST ONE BEACON

(71) Applicant: NAVER Business Platform Corp., Seongnam-si, Gyeonggi-do (KR)

(72) Inventors: Weongi Park, Seongnam-si (KR); Ho Jin Lee, Seoul (KR); Hyang Sub Lim, Seongnam-si (KR); Daewoong Kim, Seongnam-si (KR)

(73) Assignee: NAVER Business Platform Corp., Seongnam-si (KR)

(*) Notice: Subject to any disclaimer, the term of this patent is extended or adjusted under 35 U.S.C. 154(b) by 0 days.

(21) Appl. No.: 16/026,312

(22) Filed: Jul. 3, 2018

(65) Prior Publication Data
US 2018/0317048 A1    Nov. 1, 2018

Related U.S. Application Data

(62) Division of application No. 14/939,359, filed on Nov. 12, 2015, now Pat. No. 10,064,008.

(30) Foreign Application Priority Data

Dec. 26, 2014   (KR) .................... 10-2014-0191020

(51) Int. Cl.
*H04W 4/02*   (2018.01)
*H04W 40/24*   (2009.01)

(52) U.S. Cl.
CPC ......... *H04W 4/023* (2013.01); *H04W 40/244* (2013.01)

(58) Field of Classification Search
CPC combination set(s) only.
See application file for complete search history.

(56) References Cited

U.S. PATENT DOCUMENTS

| | | | |
|---|---|---|---|
| 7,433,694 | B2 | 10/2008 | Morgan et al. |
| 7,606,663 | B2 | 10/2009 | Neef et al. |
| 7,751,829 | B2 | 7/2010 | Masuoka et al. |
| 2005/0136845 | A1 | 6/2005 | Masuoka et al. |
| 2006/0087425 | A1 | 4/2006 | Haeberlen et al. |
| 2006/0106850 | A1 | 5/2006 | Morgan et al. |

(Continued)

FOREIGN PATENT DOCUMENTS

| | | |
|---|---|---|
| CN | 103313194 A | 9/2013 |
| JP | 2002357448 A | 12/2002 |

(Continued)

OTHER PUBLICATIONS

Office Action for corresponding Taiwan application No. 104137119 dated Aug. 24, 2016.

(Continued)

*Primary Examiner* — Mazda Sabouri
(74) *Attorney, Agent, or Firm* — Harness, Dickey & Pierce, P.L.C.

(57) ABSTRACT

Provided is a method and/or apparatus for providing a wireless location service using a beacon signal. A wireless location service method may include collecting a plurality of beacon signals from each of a plurality of beacon transceivers positioned around a user, and determining a current location of the user based on at least one of a virtual point and the plurality of beacon signals, the virtual point positioned in a space in which the beacon transceivers are provided.

18 Claims, 12 Drawing Sheets

(56) References Cited

U.S. PATENT DOCUMENTS

| | | | |
|---|---|---|---|
| 2015/0099539 A1 | 4/2015 | Titus et al. |
| 2016/0037424 A1 | 2/2016 | Xie et al. |
| 2016/0219408 A1 | 7/2016 | Yang et al. |

FOREIGN PATENT DOCUMENTS

| | | |
|---|---|---|
| JP | 2008076401 A | 4/2008 |
| JP | 2014216951 A | 11/2014 |
| JP | 2015224943 A | 12/2015 |
| KR | 20120102277 A | 9/2012 |
| KR | 20120124364 A | 11/2012 |
| KR | 20140055556 A | 5/2014 |
| TW | 201329486 A | 7/2013 |
| TW | 201344230 A | 11/2013 |
| TW | 201440013 A | 10/2014 |
| TW | 201445172 A | 12/2014 |

OTHER PUBLICATIONS

Japanese Office Action dated Oct. 18, 2016 for corresponding Japanese Patenet Application No. 2015-219505.
Taiwanese Office Action dated Nov. 16, 2017 for corresponding Taiwanese Patent Application No. 106115762.

METHODS, APPARATUSES, SYSTEMS, AND COMPUTER READABLE MEDIA FOR PROVIDING WIRELESS LOCATION SERVICE USING AT LEAST ONE BEACON

CROSS-REFERENCE TO RELATED APPLICATION

This is a divisional application of U.S. application Ser. No. 14/939,359, filed on Nov. 12, 2015, which claims priority from and the benefit of Korean Patent Application No. 10-2014-0191020, filed on Dec. 26, 2014 in the Korean Intellectual Property Office (KIPO), the disclosure of each of which is incorporated herein in its entirety by reference.

BACKGROUND

Field

Various example embodiments relate to technologies for determining a current location of a user using a beacon and providing a location based service based on the determined current location of the user.

Description of the Background

A wireless location service refers to technology for measuring a location of a user to provide a location based service (LBS) based on a current location of the user. The location based service provides an indoor map service, and the like, based on a location of, for example, a smart phone, a personal digital assistant (PDA), a tablet personal computer (PC), etc., positioned inside a building using, for example, a global positioning system (GPS), wireless fidelity (Wi-Fi), etc.

Here, a GPS and Wi-Fi may have difficulty in providing an appropriate location based service because the amount of location error, i.e., inaccuracy of the location calculated using GPS and Wi-Fi, of a mobile terminal inside a building is relatively high. For example, with GPS systems, the location error will be high in indoor applications because GPS receivers require an unobstructed line of sight with GPS satellites, and therefore are unusable and/or have a high location error rate when a user is located indoors, surrounded by tall buildings, etc. Wi-Fi systems may have relatively high location error rates when an application needs to determine the relatively precise location of a user (e.g., within a few meters), because Wi-Fi access points may have relatively large ranges (and thus a user may be connected to the Wi-Fi access point may potentially be located within a relatively large area) and/or the Wi-Fi signal may suffer from interference from other consumer-level radio frequency (RF) transmission within the same frequency band as a conventional Wi-Fi access point.

Additionally, the location of a user may be measured using Bluetooth. However, if Bluetooth is used, the amount of battery consumption of a mobile terminal may be high and the cost of the initial installation of the Bluetooth-based location tracking system can be burdensome.

The location of a user may also be measured using beacon transceivers. However, in some cases, it may be difficult to measure the location of the user based on the distance intervals at which the beacon transceivers are installed. For example, when beacon transceivers are densely provided at small, that is, narrow intervals inside a building, the costs may increase, the beacon signals may overlap, and interference may occur. Accordingly, it is difficult to obtain an accurate location of the user using known beacon methods. Also, when beacon transceivers are provided at relatively great, that is, wide intervals, or when the user is positioned at an intermediate point between two beacon transceivers, it may be difficult to verify the location of the user.

Accordingly, there is a need for technology that may provide a location based service by decreasing the amount of battery consumed by a mobile terminal, and to more precisely measure the location of a user.

SUMMARY

Some example embodiments provide one or more wireless location service methods, apparatuses, systems, and/or computer readable media that may provide a virtual point corresponding to a virtual space between a plurality of beacon transmitters so that the beacon transceivers may be provided at appropriate intervals based on installation cost and signal overlap, instead of providing the beacon transceivers at relatively small, or large intervals.

Some example embodiments also provide a wireless location service method and/or apparatus that may more precisely measure a location of a user inside of a building based on virtual points provided between the respective beacon transceivers and beacon signals received from the beacon transceivers.

Some example embodiments also provide a wireless location service method and/or apparatus that may provide a detailed travel route of a user using a gyro sensor of a mobile terminal.

According to at least one example embodiment, there is provided a wireless location service method executed on a wireless location service apparatus including at least one processor, wherein the method may include collecting a plurality of beacon signals from each of a plurality of beacon transceivers positioned around a user, and determining a current location of the user based on at least one of a virtual point and the plurality of beacon signals, the virtual point positioned in a space in which the plurality of beacon transceivers are provided.

The virtual point may be virtually provided to at least one of a corner of a passage and an intersection formed inside a building in which the user is positioned, and is positioned between the plurality of beacon transceivers provided at desired intervals inside the building.

The determining of the current location of the user may include determining a plurality of candidate beacon signals based on strengths of the collected plurality of beacon signals, determining whether the current location of the user corresponds to the virtual point based on the strength of the plurality of candidate beacon signals, and associating location coordinates corresponding to the virtual point as the current location of the user in response to the current location of the user corresponding to the virtual point.

The determining whether the current location of the user corresponds to the virtual point may include determining whether the current location of the user corresponds to the virtual point based on a difference value between the strengths of at least two of the plurality of candidate beacon signals and a desired difference value.

The wireless location service method may further include providing a location based service based on the current location of the user.

The wireless location service method may further include displaying a travel route according to a direction change of the user, in response to sensing the direction change of the user using a gyro sensor provided in a mobile terminal of the user.

The displaying of the travel route may include rotating and displaying an indoor map in response to the changed direction.

The collecting of the beacon signal may include collecting the plurality of beacon signals using the plurality of beacon transceivers that are constructed in advance.

According to at least one example embodiment, there is provided a file distribution system to distribute an installation file for installing an application in a mobile terminal of a user, wherein the file distribution system may include an installation file manager configured to store and manage the installation file, and an installation file transmitter configured to transmit the installation file to the mobile terminal in response to a request of the mobile terminal, and the application is configured to control the mobile terminal to receive a location based service based on a current location of the user that is determined based on at least one of a virtual point positioned in a space in which a plurality of beacon transceivers are provided and a beacon signal transmitted from each of the plurality of beacon transceivers.

The application may be configured to control the mobile terminal to display a travel route according to a direction change of the user on an indoor map, in response to sensing the direction change of the user using a gyro sensor provided in the mobile terminal of the user.

The application may be configured to control the mobile terminal to rotate and display the indoor map along the changed direction.

The application may be configured to control the mobile terminal to determine a plurality of candidate beacon signals based on strengths of the plurality of beacon signals collected from the plurality of beacon transceivers, control the mobile terminal to determine whether the current location of the user corresponds to the virtual point based on strengths of at least two of the plurality of candidate beacon signals, and control the mobile terminal to associate location coordinates corresponding to the virtual point as the current location of the user in response to the current location of the user corresponding to the virtual point.

The file distribution system may be an application store configured to receive registration of the installation file for installing the application in the mobile terminal from at least one application provider or developer.

According to at least one example embodiment, there is provided a wireless location service apparatus that may include a memory having computer readable instructions stored thereon, and at least one processor configured to execute the computer readable instructions to collect a plurality of beacon signals from each of a plurality of beacon transceivers positioned around a user, and determine a current location of the user based on at least one of a virtual point and the plurality of beacon signals, the virtual point positioned in a space in which the beacon transceivers are provided.

The virtual point may be virtually provided to at least one of a corner of a passage and an intersection formed inside a building in which the user is positioned, and is positioned between the plurality of beacon transceivers provided at desired intervals inside the building.

The at least one processor may be further configured to determine a plurality of candidate beacon signals based on strengths of the collected plurality of beacon signals, determine whether the current location of the user corresponds to the virtual point based on the strengths of the plurality of candidate beacon signals, and associate location coordinates corresponding to the virtual point as the current location of the user in response to the current location of the user corresponding to the virtual point.

The at least one processor may be further configured to determine whether the current location of the user corresponds to the virtual point based on a difference value between the strengths of at least two of the plurality of candidate beacon signals and a desired difference value.

The wireless location service apparatus may be configured to display a travel route according to a direction change of the user, in response to sensing the direction change of the user based on a gyro sensor provided in a mobile terminal of the user.

The at least one processor may be further configured to collect the plurality of beacon signals using the plurality of beacon transceivers that are constructed in advance.

According to at least one example embodiment, there is provided a wireless location service apparatus that may include a memory having computer readable instructions stored thereon, and at least one processor configured to execute the computer readable instructions to receive a plurality of beacon signals collected from each of a plurality of beacon transceivers positioned around a user, through an application installed on a mobile terminal of the user, determine a current location of the user based on at least one of a virtual point and the plurality of beacon signals, the virtual point positioned in a space in which the beacon transceivers are provided, and provide, to the mobile terminal, a location based service based on the determined current location of the user.

According to at least one example embodiment, there is provided a system for providing wireless location services that may include at least one mobile terminal including at least one processor and configured to collect a plurality of wireless beacon signals and transmit the collected plurality of wireless beacon signals to at least one server, at least two wireless beacons each include a transceiver and are configured to each transmit a wireless beacon signal, each of the wireless beacon signals including a unique beacon identifier and location information associated with the wireless beacons, and the at least one server configured to store at least one virtual point of an environment in a storage device, each of the at least one virtual point virtually and including location information associated with the respective virtual point, and determine a current location of the at least one mobile terminal based on the location information of the at least one of the collected wireless beacon signals and the at least one virtual point.

The at least one server may be further configured to provide to the at least one mobile terminals at least one location based service associated with the determined current location of the at least one mobile terminal, the at least one location based service including at least one of a mobile payment service, a map service, a path guide, a routing service, a messaging service.

The at least one server may be one of the at least one mobile terminal.

The at least two wireless beacons and the at least one virtual point may be located inside of a building.

The at least two wireless beacons may each be configured to transmit the wireless beacon signal using Bluetooth Low Energy (BLE) protocol.

The determination of the current location of the at least one mobile terminal may further include determining at least one candidate beacon signal based on strengths of the collected wireless beacon signals based on a comparison of the strengths of the collected wireless beacon signals with a threshold value, and associating the current location of the at least one mobile terminal with the location information of the respective wireless beacon of the at least one candidate beacon signal or a virtual point of the at least one virtual point arranged proximately to the at least one wireless beacon associated with the candidate beacon signals based on results of a comparison of the at least one candidate beacon signal with a reference value.

It is to be understood that both the foregoing general description and the following detailed description are explanatory and are intended to provide further explanation of the example embodiments as claimed.

According to at least one example embodiment, because a virtual point corresponding to a virtual space is provided between beacon transceivers instead of providing the beacon transceivers at relatively small or large intervals, the beacon transceivers may be provided at appropriate intervals to reduce installation costs and to decrease and/or remove beacon signal overlap.

Also, according to at least one example embodiment, it is possible to more precisely measure a location of a user inside a building, or other space, based on virtual points provided between the respective beacon transceivers and beacon signals received from the beacon transceivers.

Also, according to at least one example embodiment, it is possible to provide a detailed route traveled by a user by providing a location based service using a gyro sensor of a mobile terminal.

BRIEF DESCRIPTION OF THE DRAWINGS

The foregoing and other features of the example embodiments will be apparent from the more particular description of non-limiting example embodiments, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Figure 1:
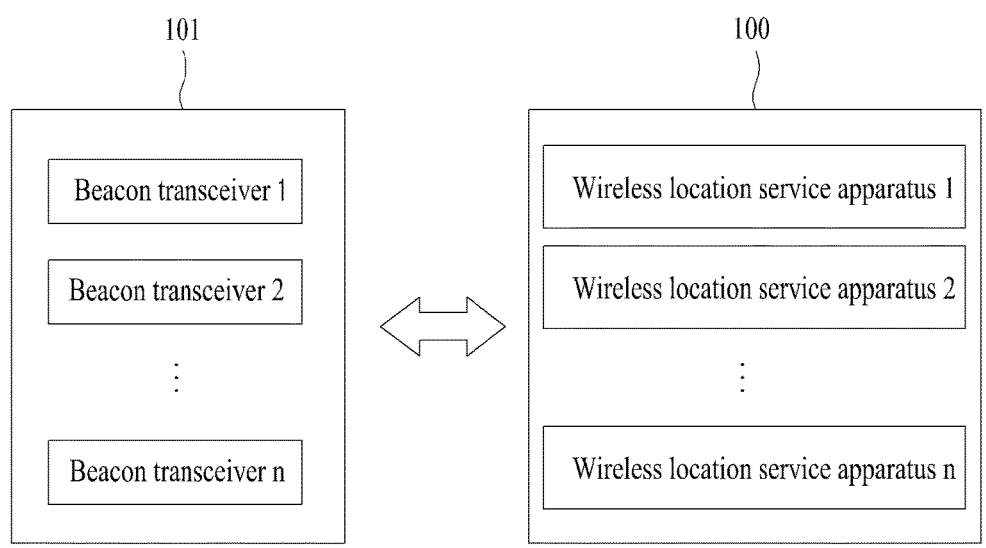
FIG. 1 illustrates an example of a plurality of wireless location service apparatuses and a plurality of beacon transceivers according to at least one example embodiment.

Various example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of the example embodiments to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first," "second," etc., may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein Hereinafter, various example embodiments will be described with reference to the accompanying drawings.

At least one example embodiment may be applicable to at least one mobile terminal, for example, a smartphone, a tablet, a laptop computer, a wearable smart device, personal digital assistant (PDA), a portable gaming device, wireless location determination device, etc., which provides a location based service using, for example, a Bluetooth low energy (BLE) based beacon signal. For example, at least one example embodiment may be employed for a mobile terminal in which Android application program interface (API) 4.3 or greater, iOS7 or greater, or Bluetooth 4.0 or greater is installed. Although some example embodiments will be described based on an example of providing a location based service using at least one beacon, they are only examples. Accordingly, in addition to a beacon, a location based service may be provided through a mobile terminal in which a communication module that provides a performance similar to the beacon is installed. For example, technology for applying a location based service using a virtual point proposed herein may be applicable to all low power near field communication modules in addition to a beacon, such as NFC communications, infrared (IR)_communications, RFID, other radio frequency communications, etc.

FIG. 1 illustrates an example of a system for providing wireless location service using at least one beacon according to some example embodiments.

Referring to FIG. 1, one or more plurality of transmitters 101 may be provided in the system. Here, the one or more beacon transceivers 101 may be provided in an environment, such as stores positioned inside a building, shopping center, shopping plaza, open air market, along a street or pathway, etc. to provide various location based services, such as a mobile payment service, a map service, a path guide, a routing service, a messaging service, etc., and may be provided in various locations throughout the environment, such as on the ceiling of a passage inside the building, on storefronts, lampposts, poles, elevated structures, etc., to provide various location dependent information, applications, or services, such as, event and discount coupon information, a building guide, announcements, alerts, etc.

Additionally, the system may include one or more wireless location service apparatuses 100 configured to receive beacon signals from the one or more of the beacon transceivers 101 provided in the environment. For example, the system may provide one or more location based services to the one or more wireless location service apparatus 100 in the inside of a building while the one or more users are moving through the building. In response to executing an application for receiving a location based service, the one or more wireless location service apparatuses 100 may determine a current location of the user, and may receive a location based service, for example, an indoor map, a path guide, event information, a messaging service, etc., that may be specialized for the building based on the determined current location of the user(s).

For example, the one or more wireless location service apparatuses 100 may use a smartphone, a tablet, a laptop, a PDA, a wearable smart device, wireless location determination device, etc., and may refer to any type of terminal device capable of connecting to a website/mobile site associated with a location based service or installing and executing a service exclusive application. Here, the wireless location service apparatuses 100 may perform the overall service operation, such as a service screen configuration, a data input, a data transmission and reception, a data storage, or the like, under the control of the website/mobile site or the exclusive application.

Additionally, at least one of the one or more wireless location service apparatuses 100 may be a server, or other computing device, that is communicatively connected to the beacon transceivers 101 and the other wireless location service apparatuses 100, wherein the other wireless location service apparatuses are mobile terminals. The server wireless location service apparatus may determine the current location of one or more of the mobile terminals based on received signals from one or more of the beacon transceivers 101, and may then provide location based services to the one or more mobile terminals based on the determined current locations of the mobile terminals. Also, the server wireless location service apparatus may receive the determined current location information of the one or more mobile terminals from the mobile terminals themselves, and may provide location based services to the mobile terminals based on the received current location information from the mobile terminals.

While a plurality of beacon transceivers 101 and a plurality of wireless location service apparatuses 100 are depicted in the system of FIG. 1, the example embodiments are not limited thereto, and any number of beacon transceivers 101 and wireless location service apparatuses 100 may be present in various system for providing wireless location service using at least one beacon example embodiments.

Figure 2:
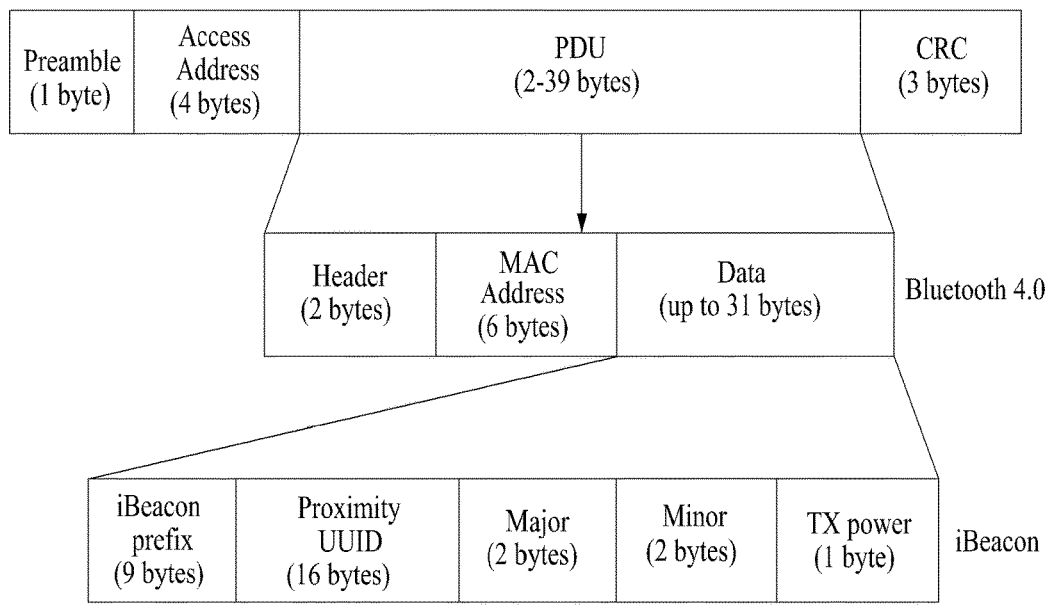
FIG. 2 illustrates an example of a packet format of a beacon signal transmitted from a beacon transceiver according to at least one example embodiment.

FIG. 2 illustrates an example of a packet format of a beacon signal transmitted from a beacon transceiver according to some example embodiments.

Referring to FIG. 2, the packet format of the beacon signal indicates a low-power based BroadCast packet format, and a packet may include, for example, 1 byte of a preamble, 4 bytes of an access address, 2 to 39 bytes of a protocol data unit (PDU), and 3 bytes of a cyclic redundancy check (CRC) code. However, the packet format of the beacon signal is not limited thereto, and may be of other data formats.

The PDU may include, for example, 2 bytes of a header, 6 bytes of a media access control (MAC) address, and 31 bytes of data. However, the packet format of the beacon signal is not limited thereto, and may be of other data formats. Here, data may include unique identification, for example, major and minor unique identifiers, assigned to each beacon signal. As described above, since identification information is included for each beacon signal, a wireless location service apparatus may identify each of the beacon signals received from the plurality of beacon transceivers, and may verify the identity of the beacon transceiver(s) that is located near to the current position of the wireless location service apparatus 100 that corresponds to the received beacon signal(s).

Figure 3:
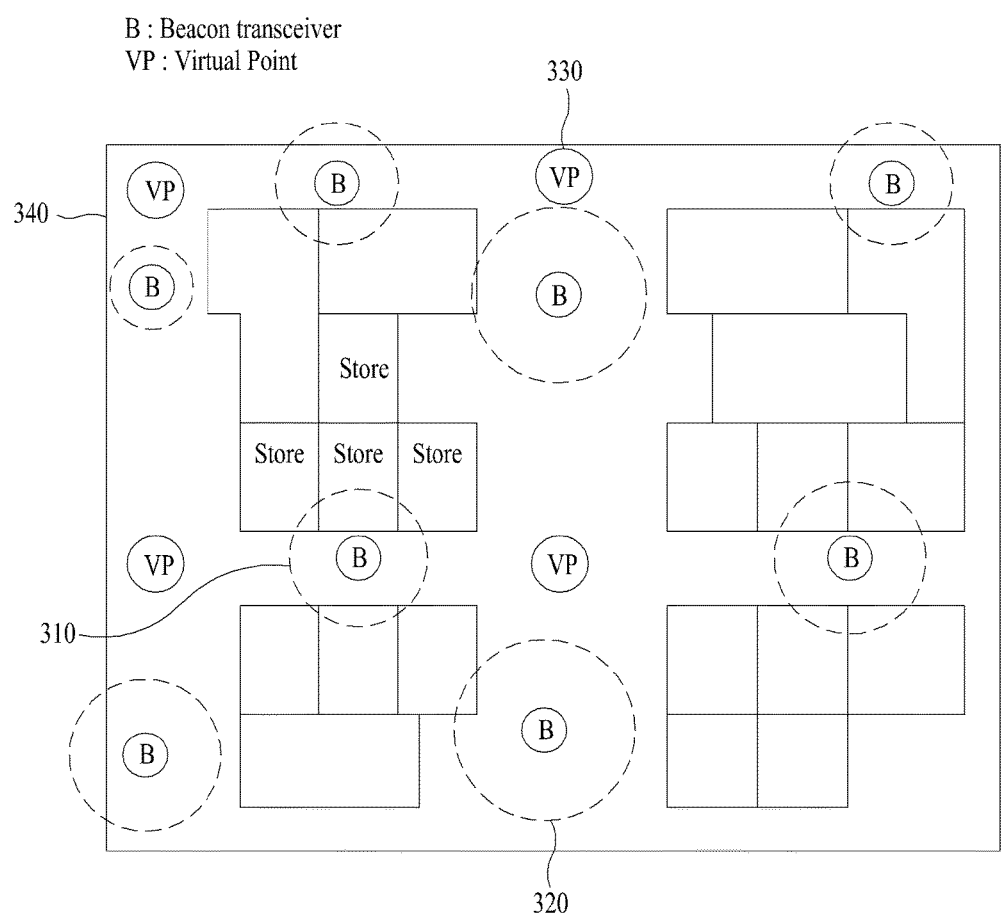
FIG. 3 illustrates an example of beacon transceivers and virtual points provided in a building to provide a wireless location service based on a Bluetooth low energy (BLE) protocol according to at least one example embodiment.

FIG. 3 illustrates an example of beacon transceivers and virtual points provided in a building to provide a wireless location service according to some example embodiments.

Referring to FIG. 3, one or more beacon transceivers B may be provided at desired and/or preset intervals throughout an environment, such as in the center portion of a building passage or hallway (e.g., beacon transceiver 310), rather than a corner of the passage, and at an intersection inside of a building (e.g., beacon transceiver 320).

For example, the beacon transceivers B may be provided on the ceiling, facing the floor, and may be placed at regular intervals of, for example, 10 to 13 m. The beacon signal may be vertically and/or horizontally radiated with respect to an installation direction and/or may have a directionality. Accordingly, the beacon transceivers B may be provided at intervals greater than intervals of 10 to 13 m in a square or an open space. That is, the beacon transceivers B may be placed at constant intervals by adjusting the installation placement intervals to be different based on the characteristics and size of the environment layout (e.g., building layout, open air space layout, street layout, etc.) and/or based on the operating characteristics of the beacon transmitter (e.g., signal transmission strength and/or range).

A virtual point VP may be positioned and/or assigned between at least two of the beacon transceivers B (e.g., VPs 330 and 340). As described above, when the plurality of beacon transceivers B are densely provided at relatively small intervals in an environment, such as the inside of a building, the beacon signals from two or more of the plurality of beacon transceivers B may overlap. When the beacon transceivers B are placed at appropriate intervals, a case in which a user location is inaccurate may occur. Accordingly, by positioning a virtual point VP corresponding to a virtual space between the at least two of the beacon transceivers B, the number of beacon transceivers B to be provided may be reduced and accordingly, it is possible to achieve cost savings and a decrease in the amount of interference caused by signal overlapping may be achieved. Further, although the user is positioned in the middle of the transceivers B, the location of the user may be more precisely verified. Here, the virtual point VP may be provided in a space corresponding to an intermediate location between two or more of the plurality of beacon transceivers B, and may be provided in various locations throughout an environment, such as a building's corner of a passage and/or an interaction inside a building to more precisely verify a change in the travel direction of the user.

The virtual point VP may be positioned and/or assigned using a wireless location service apparatus, including the server wireless location service apparatus. The location information associated with the VP may be stored in a database and/or other storage device associated with the wireless location service apparatus. VPs may be repositioned in order to facilitate the improvement of the accuracy of the location information of users, and new VPs may be added to the existing VPs of a system.

Hereinafter, an operation of determining a current location of a user based on a beacon signal and a virtual point will be further described with reference to FIGS. 4 and 5.

Figure 4:
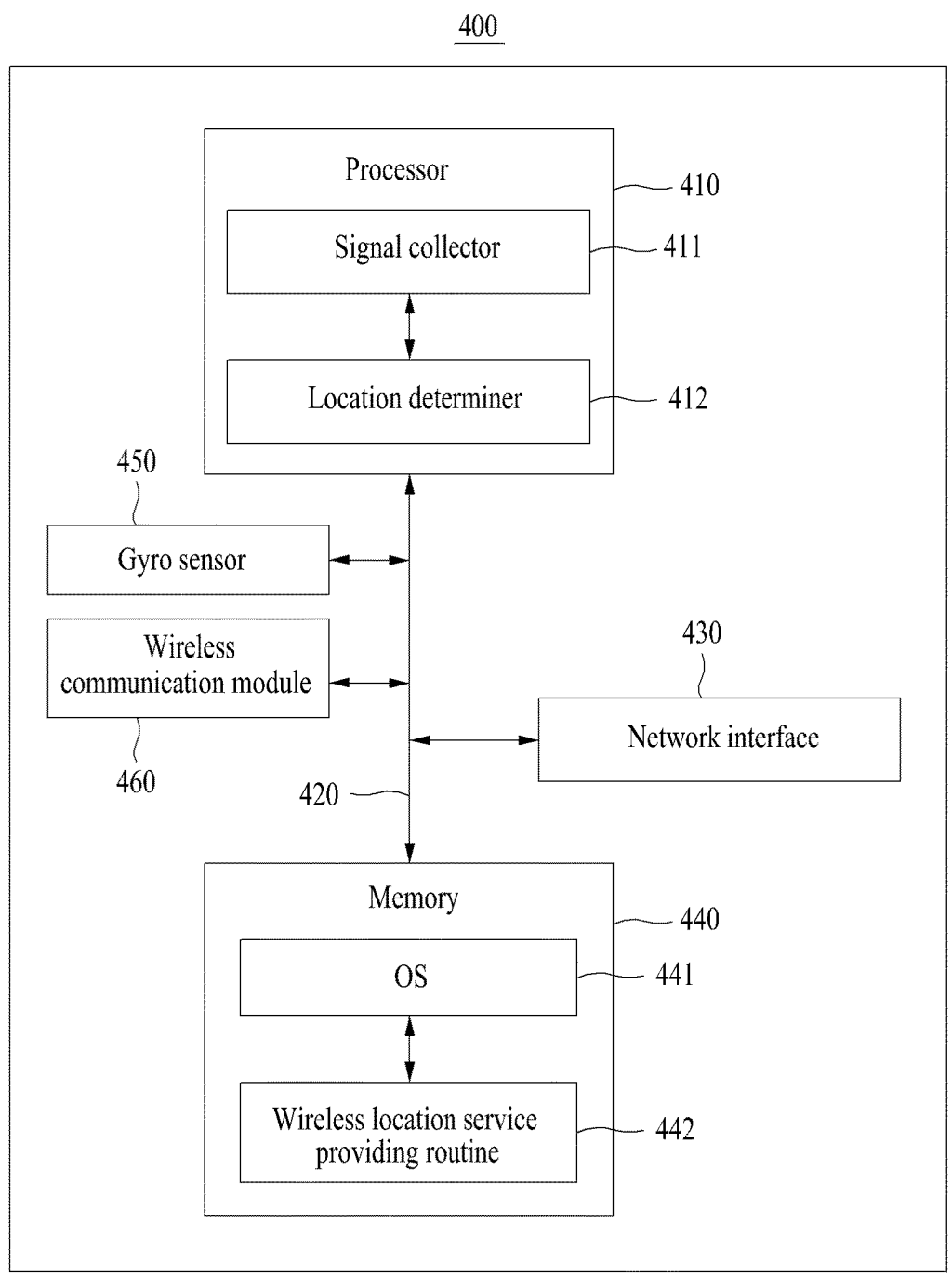
FIG. 4 is a block diagram illustrating an example of a configuration of a wireless location service apparatus according to at least one example embodiment.
Figure 5:
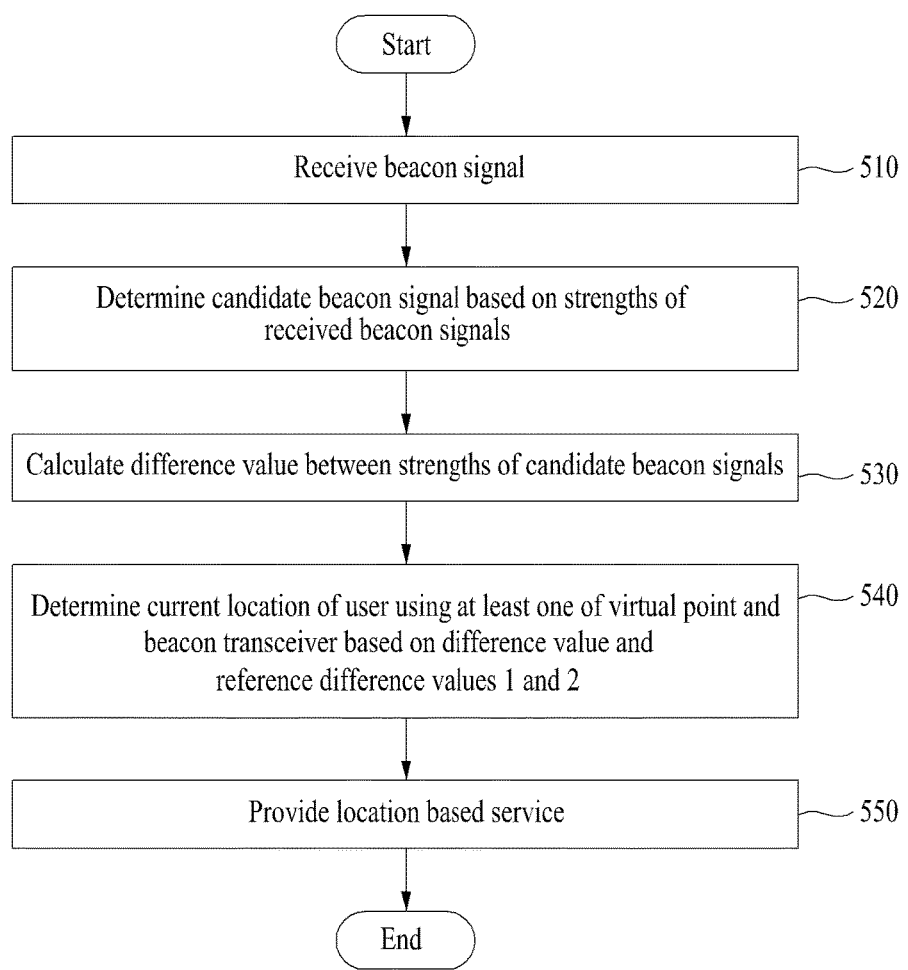
FIG. 5 is a flowchart illustrating an example of a wireless location service method according to at least one example embodiment.

FIG. 4 is a block diagram illustrating an example of a configuration of a wireless location service apparatus according to some example embodiments, and FIG. 5 is a flowchart illustrating an example of a wireless location service method according to some example embodiments.

Referring to FIG. 4, the wireless location service apparatus 400 may include at least one processor 410, a bus 420, a network interface 430, a memory 440, a gyro sensor 450, and a wireless communication module 460. The memory 440 may include an operating system (OS) 441 and a wireless location service providing routine 442. The at least one processor 410 may include a signal collector 411 and a location determiner 412. Alternatively, or in addition to the processors discussed above, the wireless location service apparatus may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors.

According to other example embodiments, the wireless location service apparatus 400 may include the same, less, or more number of constituent elements than the number of constituent elements shown in FIG. 4. For example, the wireless location service apparatus 400 may include other constituent elements such as a display or a transceiver.

The memory 440 may include a permanent mass storage device, such as a random access memory (RAM), a read only memory (ROM), a disc drive, a solid state drive, an optical drive, etc., as a non-transitory computer-readable storage medium. Also, program codes (e.g., computer readable instructions) for the OS 441 and the wireless location service providing routine 442, and the like, may be stored in the memory 440. Such software constituent elements may be loaded from another non-transitory computer-readable storage medium separate from the memory 440 using a drive mechanism (not shown). The other non-transitory computer-readable storage medium may include, for example, a floppy drive, a disc, a tape, a DVD/CD-ROM drive, a memory card, etc. Software constituent elements may be loaded to the memory 440 through the network interface 430 instead of, or in addition to, the non-transitory computer-readable storage medium.

The bus 420 enables communication and data transmission between the constituent elements of the wireless location service apparatus 400. The bus 420 may be configured using a high-speed serial bus, a parallel bus, a storage area network (SAN), and/or another appropriate communication technology.

The network interface 430 may be a computer hardware constituent element for connecting the wireless location service apparatus 400 to the computer network. The network interface 430 may connect the wireless location service apparatus 400 to the computer network through a wireless and/or wired connection.

The gyro sensor 450 may be a sensor configured to sense a travel direction of a user moving in the building and whether the user has changed direction. The gyro sensor 450 may be a gyroscope, an accelerometer, or the like.

The wireless communication module 460 may be used to communicate with wireless access points and beacon transceivers positioned inside the building, and to transmit and receive information for determining a current location of the user. For example, the wireless communication module 460 may include a WiFi module, a ZigBee module, a Bluetooth module, an infra-red communication (IR) module, a Near-Field Communication (NFC) module, RFID, other radio frequency communications, etc. Here, the Bluetooth module may include Bluetooth 3.0 in addition to BLE-based Bluetooth 4.0 or greater.

The processor 410 may determine the current location of the user in the environment, such as the inside of the building, by executing the wireless location service providing routine 442 stored in the memory 440, and may provide a location based service based on the determined current location of the user.

The processor 410 may be configured to execute computer-readable instructions of a computer program by performing a basic arithmetic operation, a logic operation, and/or an input/output operation of the wireless location service apparatus 400. The computer-readable instructions may be provided from the memory 440 and/or the network interface 430 to the processor 410 through the bus 420. The processor 410 may be configured to execute program codes/instructions for the signal collector 411 and the location determiner 412. The program codes/instructions may be stored in a storage device such as the memory 440.

When executed by a processor, such as the at least one processor 410, the computer-readable instructions associated with the signal collector 411 and/or the location determiner 412 may transform the processor 410 into a special purpose processor configured to perform operations 510 through 550 of FIG. 5.

In operation 510, the signal collector 511 may receive at least one beacon signal from at least one beacon transceiver positioned around a user among a plurality of beacon transceivers provided in an environment, such as a building. Here, the beacon transceivers may be provided at desired (or alternatively, predetermined) intervals on the center ceiling of a passage in the building, and one or more virtual points may be provided between the beacon transceivers. Here, the virtual point includes at least the location coordinates of a space positioned between the beacon transceivers. The location coordinates may be two-dimensional coordinates, three-dimensional coordinates, latitude, longitude, and/or altitude coordinates, absolute coordinates, and/or relative coordinates. For example, a subset of the plurality of beacon transceivers may be provided on different floors (and/or levels) of a building, structure, etc., and the location coordinates of the virtual point may also include the altitude and/or floor information of the beacon transceiver, along with the two-dimensional position information.

In operation 520, the location determiner 412 may determine a candidate beacon signal based on the strengths of the received beacon signals from the at least one beacon transceiver provided, installed and/or located within the environment (e.g., a building, etc.).

For example, the location determiner 412 may determine a desired and/or preset number of candidate beacon signals in descending order of strengths by comparing the strengths of received beacon signals, for example, using the received signal strength indication (RSSI) values. For example, when determining two candidate beacon signals, the location determiner 412 may determine two beacon signals having relatively great (and/or similar) strengths among the received beacon signals as candidate beacon signals and may store information regarding the two candidate beacon signals. Additionally, the location determiner 412 may use desired threshold values to determine whether beacon signals are to be categorized as being candidate beacon signals. For example, the location determiner 412 may include a minimum received beacon signal strength threshold value that is used to determine whether a received beacon signal is to be considered a candidate beacon signal or not. Additionally, the location determiner 412 may be configured to only accept the highest N number of received beacon signals (N being an integer) that correspond to the strongest beacon signals received. The location determiner 412 may then store packet data that includes, for example, identification information of the two candidate beacon signals, a MAC address, etc., regarding the candidate beacon signals. Since any remaining beacon signals are discarded, it is possible to prevent the storage space from being wasted.

In operation 530, the location determiner 412 may calculate a difference value between the strengths of the candidate beacon signals. For example, when two candidate beacon signals are determined, the location determiner 412 may calculate a difference value between an RSSI value of a first candidate beacon signal (e.g., candidate beacon signal 1) and an RSSI value of a second candidate beacon signal (e.g., candidate beacon signal 2). However, the example embodiments are not limited to two candidate beacon signals, and there may be any number of candidate beacon signals.

In operation 540, the location determiner 412 may determine the current location of the user using at least one of a virtual point and a beacon transceiver, based on the calculated difference value and a first and second desired (and/or preset) reference difference values (e.g., reference difference values 1 and 2). While two reference values are discussed in connection with this example embodiment, the example embodiments are not limited thereto and may include any number of reference difference values. An operation of determining the current location of the user based on the calculated difference value and the reference difference values 1 and 2 will be described with reference to FIGS. 6 through 9.

In operation 550, the processor 410 may provide a location based service based on the current location of the user by executing the wireless location service providing routine 442 stored in the memory 440.

For example, the wireless location service providing routine 442 may provide an indoor map such as a path guide based on the current location of the user inside a building, or may provide event and coupon discount information corresponding to stores, attractions, or the like, proximate to the user's determined location in response to a movement of the user.

In this example, the gyro sensor 450 may sense a direction change of the user. Accordingly, the wireless location service providing routine 442 may apply a location change to the indoor map immediately in response to the user changing a direction to the left, to the right, and/or the elevation, or in response to the user changing a direction at a corner of a passage or an intersection. For example, when the user is determined to be inside of a building, the wireless location service providing routine 442 may rotate the indoor map based on a direction toward which the user has changed a direction and may provide the user with the rotated indoor map. An operation of providing a detailed travel route of the user using the gyro sensor 450 will be described with reference to FIG. 10.

Figure 6:
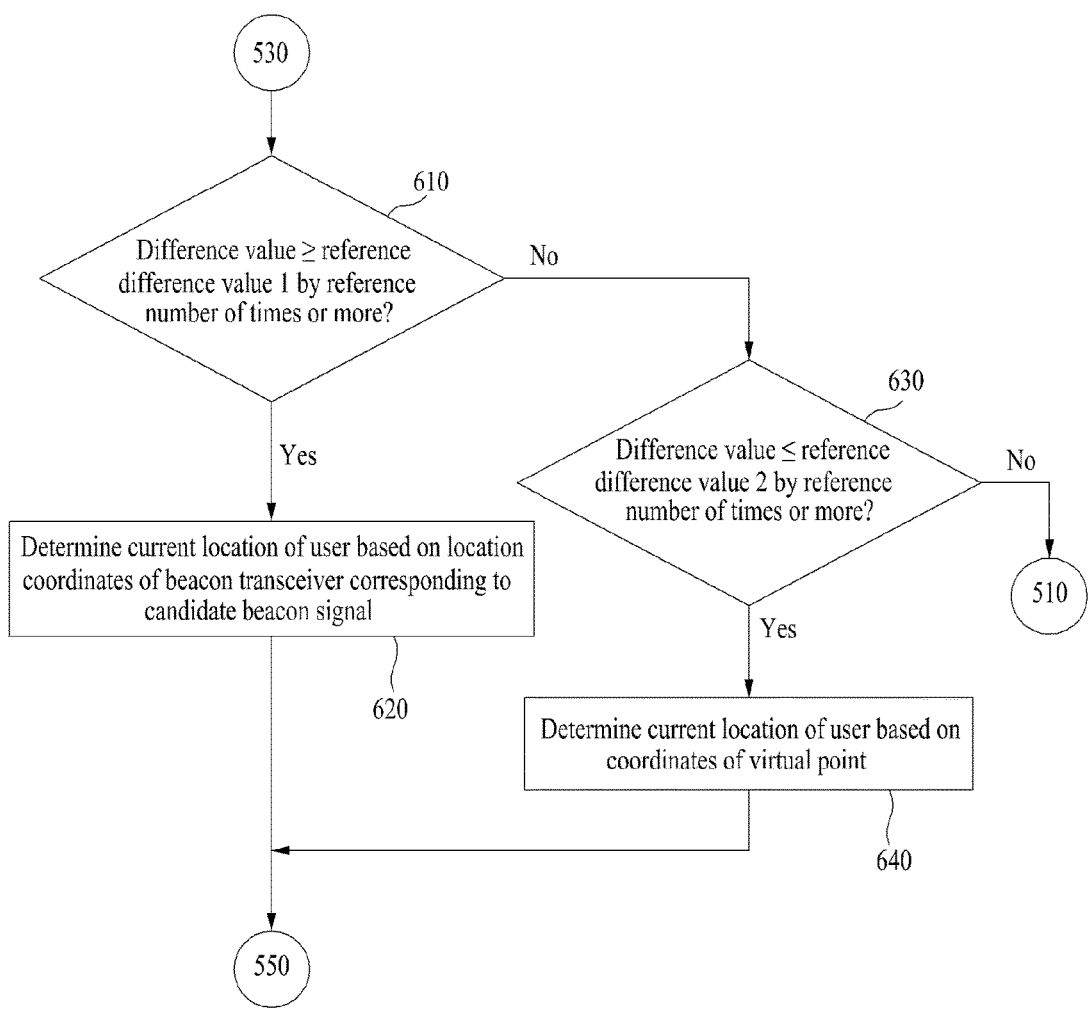
FIG. 6 is a flowchart illustrating an operation of determining a current location of a user based on reference difference values 1 and 2 according to at least one example embodiment.
Figure 7:
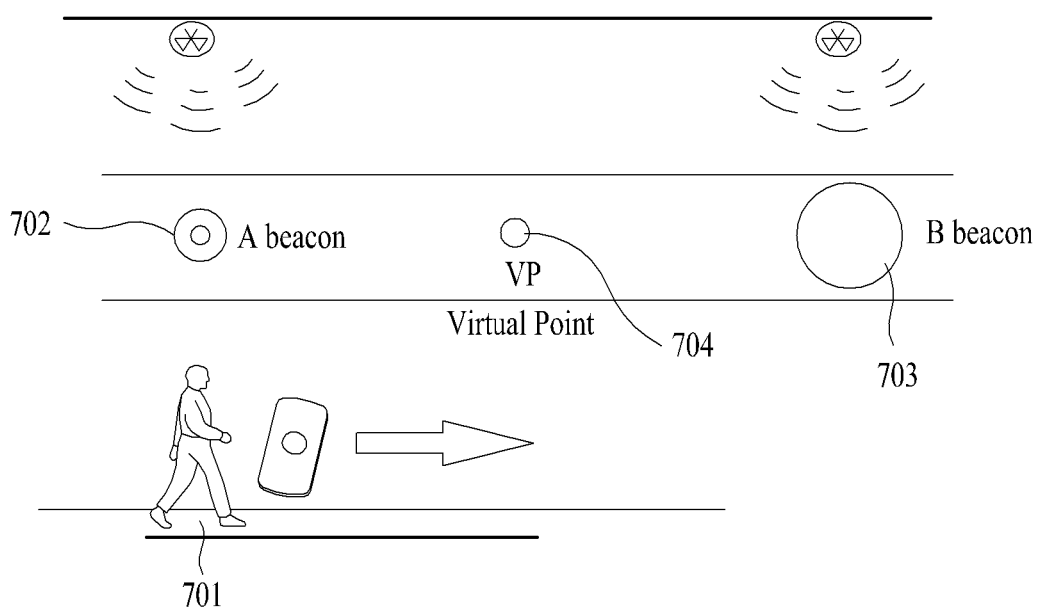
FIGS. 7 and 8 illustrate examples of determining a current location of a user using a beacon transceiver according to at least one example embodiment.
Figure 8:
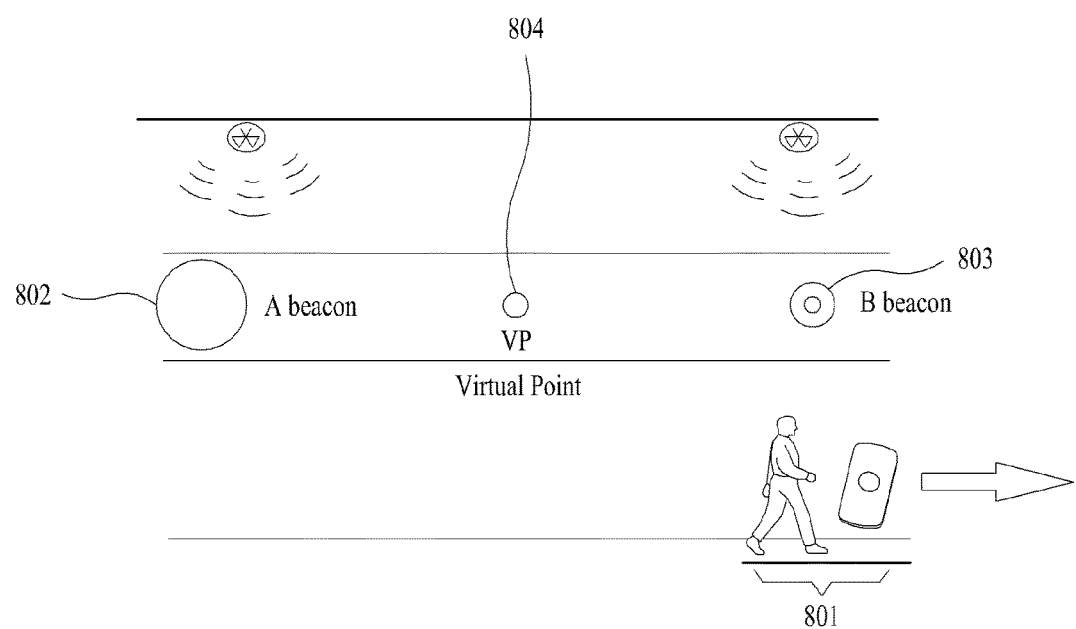
Figure 9:
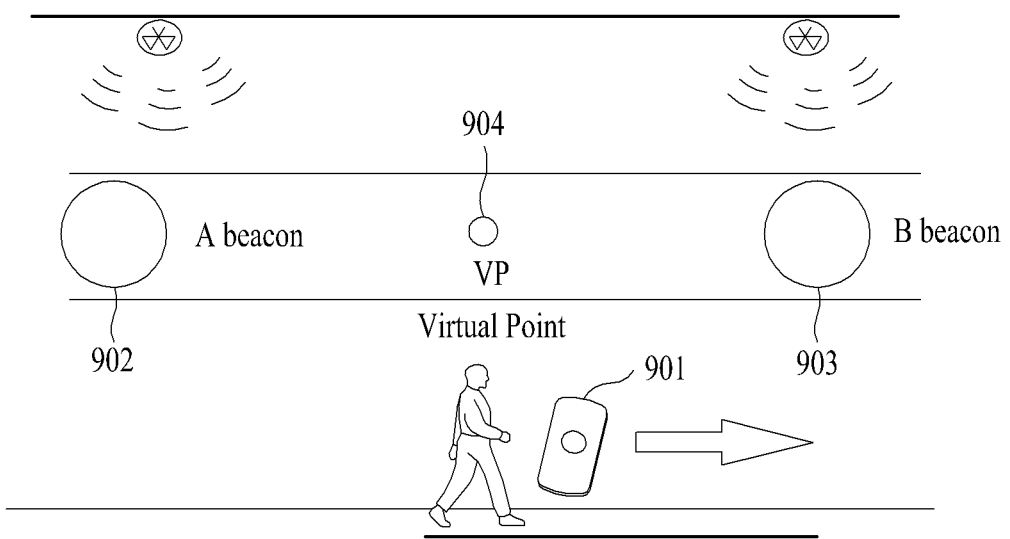
FIG. 9 illustrates an example of determining a current location of a user using a virtual point according to at least one example embodiment.

FIG. 6 is a flowchart illustrating an operation of determining a current location of a user based on reference difference values 1 and 2 according to some example embodiments. That is, FIG. 6 is a flowchart illustrating operation 540 of FIG. 5 in detail. FIGS. 7 and 8 illustrate examples of determining a current location of a user using at least one beacon transceiver according to some example embodiments, and FIG. 9 illustrates an example of determining a current location of a user using at least one virtual point according to some example embodiments.

In operation 610, the location determiner 412 may compare whether a difference value between the strengths of the at least one candidate beacon signal is greater than or equal to a reference difference value 1 by a desired and/or preset reference number of times or more. For example, when the reference number of times is set as twice or more, the reference difference value 1 may be set as, for example, 5 dB, 10 dB, etc.

In this example, when the difference value between the strengths of candidate beacon signals is less than the reference number of times, for example, when the reference value is greater than or equal to the reference difference value 1 once, the location determiner 412 may temporarily store the difference value during a desired and/or preset period of time. When the difference value greater than or equal to the reference difference value 1 is absent during the desired and/or preset period of time, the location determiner 412 may discard the temporarily stored difference value.

On the contrary, when the difference value greater than or equal to the reference difference value 1 is present during the desired and/or preset period of time, the location determiner 412 may determine the current location of the user based on location coordinates of a beacon transceiver having transmitted a candidate beacon signal used for calculating the difference value as seen in operation 620.

Referring to FIG. 7, in an example in which beacon signals transmitted from a beacon transceiver A 702 and a beacon transceiver B 703 are determined as candidate beacon signals, and a difference value between strengths of the beacon signals is greater than or equal to the reference difference value 1 by a reference number of times or more, for example, yes in operation 610, the location determiner 412 may determine the current location of the user based on coordinates of a beacon transceiver.

In this example, when the beacon signal of the beacon transceiver A 702 has a strength greater than the beacon signal of the beacon transceiver B 703, the location determiner 412 may determine the current location of the user based on location coordinates of the beacon transceiver A 702. For example, since the strength of a beacon signal is attenuated according to an increase in a distance from the location at which the beacon transceiver is physically installed and/or located, the location determiner 412 may calculate a distance between the user and the beacon transceiver A 702 based on the strength of the beacon signal received from the beacon transceiver A 702. Therefore, the location determiner 412 may determine coordinates corresponding to the current location of the user 701 (and/or the user's mobile terminal) based on the calculated distance from at least one candidate beacon transceiver of the one or more beacon transceivers. In addition, when beacon transceivers are located at relatively small and/or physically close intervals, the location determiner 412 may determine location coordinates of the beacon transceiver A 702 as the current location of the user 701 to increase the processing rate and to more quickly provide a location based service, since the user 701 is determined to be the closest to beacon transceiver A 702.

Additionally, while only one user 701 is depicted in the FIG. 7, the example embodiments are not limited thereto, and any number of users may be present in various example embodiments.

Similarly, referring to FIG. 8, in an example in which the beacon signal of the beacon transceiver B 803 has a strength greater than the beacon signal of the beacon transceiver A 802, the location determiner 412 may determine the current location of the user 801 based on location coordinates of the beacon transceiver B 803.

Referring again to FIG. 6, in conjunction with FIG. 8, when the difference value is not greater than or equal to the reference difference value 1 by the desired and/or preset reference number of times or more, for example, no in operation 610, the location determiner 412 may increase a number count (e.g., number count 1) by 'one'. Here, the number count 1 may be used to compare whether a number of times corresponding to a subsequent occurrence of a case in which the difference value is greater than or equal to the reference difference value 1 is greater than or equal to the reference number of times.

In operation 630, the location determiner 412 may determine whether the difference value between the strengths of candidate beacon signals associated with beacon transceivers 802 and 803 is less than or equal to the reference difference value 2 by the desired and/or preset reference number of times or more. Here, the reference number of times may be desired and/or preset to be twice or more and may be desired and/or preset to be the same as or different from the reference number of times used for comparison with the reference difference value 1. For example, the reference difference value 2 may be desired and/or preset to a value of 3 dB or less.

When the difference value is less than or equal to the reference difference value 2 by the reference number of times or more, for example, yes in operation 630, the location determiner 412 may determine the current location of the user 801 based on the location coordinates of a virtual point VP 804 positioned between the beacon transceivers 802 and 803 corresponding to the two candidate beacon signals.

Additionally, while only one user 801 is depicted in the FIG. 8, the example embodiments are not limited thereto, and any number of users may be present in various example embodiments.

Referring to FIG. 9, in an example in which the user moves along a passage from a beacon transceiver A 902 towards a beacon transceiver B 903, a wireless location service apparatus 901 may be positioned in a space in which the strength of a beacon signal received from the beacon transceiver A 902 is similar to the strength of a beacon signal received from the beacon transceiver B 903. For example, a difference value between strengths of beacon signals received from the beacon transceiver A 902 and the beacon transceiver B 903 may be less than or equal to 3 dB.

In operation 640, the location determiner 412 may determine, as the current location of the user 901, the already known (e.g., predetermined) location coordinates of a virtual point VP 904 provided between the beacon transceiver A 902 and the beacon transceiver B 903. The wireless location service providing routine 442 may provide a location based service based on the determined current location of the user 901 using the virtual point 904. As described above, when beacon signals transmitted from two beacon transceivers have a similar strength, the current location of the user may be determined using a virtual point positioned in the middle of the two beacon transceivers. Accordingly, the current location of the user may be more precisely determined. For example, the error range may be reduced to be 5 to 6 m.

On the contrary, when the difference value is not less than or equal to the reference difference value 2 by the reference number of times or more, for example, no in operation 630, the location determiner 412 may increase a number count 2 by 'one' and may continuously collect beacon signals. In detail, operations 510 through 550 of FIG. 5 and operations 610 through 640 of FIG. 6 may be repeated by returning to operation 510 of FIG. 5. Here, the number count 2 may be used to compare whether a number of times corresponding to a subsequent occurrence of a case in which the difference value is less than or equal to the reference difference value 2 is less than or equal to the reference number of times.

Additionally, while only one user 901 is depicted in the FIG. 9, the example embodiments are not limited thereto, and any number of users may be present in various example embodiments.

Figure 10:
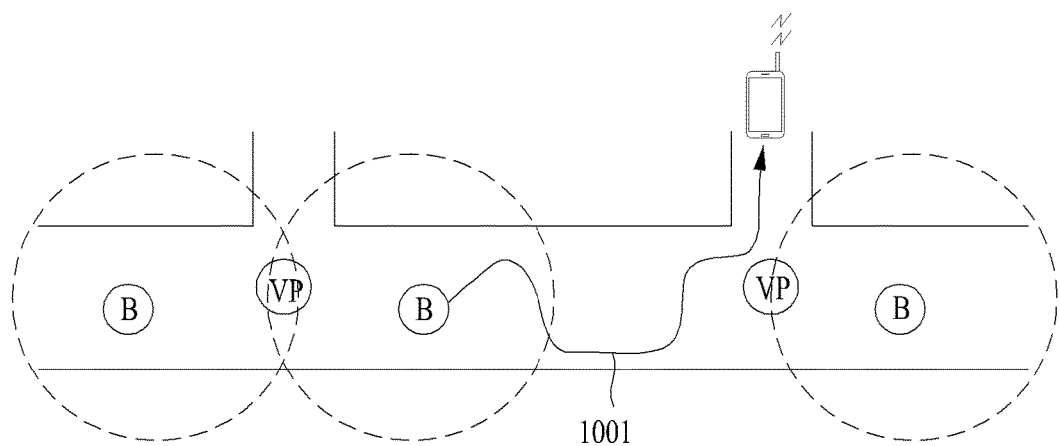
FIG. 10 illustrates an example of providing a detailed travel route of a user using a gyro sensor according to at least one example embodiment.

FIG. 10 illustrates an example of providing a detailed travel route of a user using a gyro sensor according to some example embodiments.

Since many structures and physical objects, for example, sewerage pipes, electric wiring, external radio signals, etc., may have influence on electro-magnetic properties inside an environment such as a building, magnetic properties may vary in various directions. When a direction, for example, cardinal points north, south, east, and west, of the user is determined indoors based on a compass, a completely wrong direction may be determined as the direction of the user due to a significantly great error. Accordingly, an operation using a gyro sensor and a beacon to accurately determine the direction of the user even indoors will be described with reference to FIG. 10. For example, in the case of using the gyro sensor, cardinal points may be incorrect, however, an accurate turned angle may be known based on a sensing value. A reference point may be known based on a beacon transceiver or a virtual point. In this case, a wireless location service apparatus may verify whether the direction change has occurred by, for example, 90 degrees, 180 degrees, etc., based on the reference point.

FIG. 10 illustrates an example in which a user holding a wireless location service apparatus, for example, a smart phone is moving toward a destination inside a building while watching products of stores on both sides based on a passage or while changing a direction to the left, the right, and the like, to avoid people, instead of consistently moving based on the center of the passage. When moving toward the destination as described above, the wireless location service apparatus may display a detailed travel route 1001 of the user on an indoor map using the gyro sensor. Further, the wireless location service apparatus may rotate a map by applying a changed direction according to a movement of the user to the indoor map and thereby provide the rotated map to the user.

For example, when the user turns to the left at the corner, the gyro sensor may immediately sense that the user has changed direction to the left. The wireless location service providing routine 442 may rotate the indoor map to the direction toward which the user has changed a direction and may provide the rotated map to the user. As described above, since the indoor map is rotated in response to the direction change of the user and thereby provide a map to the user from the current location up to the destination, it is possible to further precisely guide the user.

Figure 11:
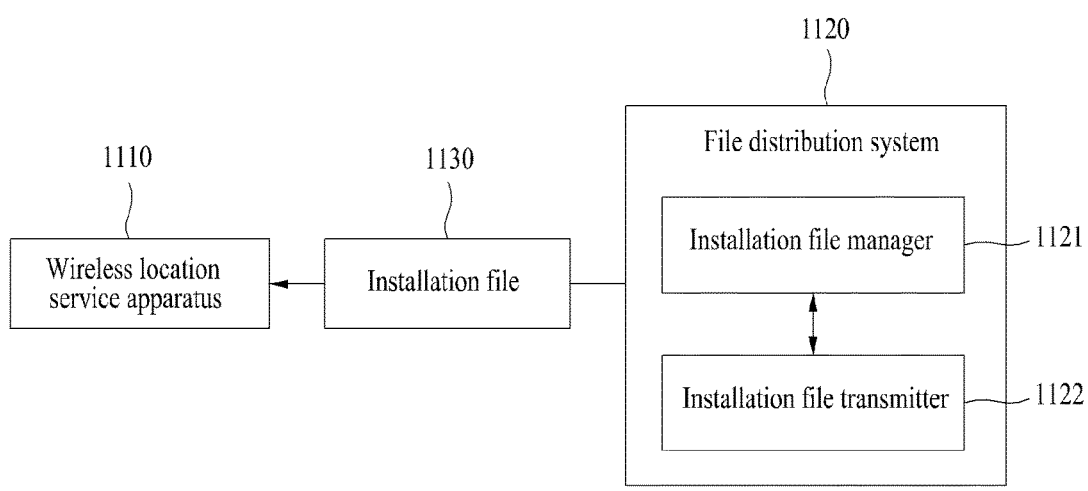
FIG. 11 illustrates an example of an environment for executing a location based service providing method according to at least one example embodiment.

FIG. 11 illustrates an example of an environment for executing a location based service method according to some example embodiments. FIG. 11 illustrates a wireless location service apparatus 1110, a file distribution system 1120, and an installation file 1130.

The wireless location service apparatus 1110 may be a mobile terminal, for example, a smartphone, a tablet, a laptop, a PDA, a wearable smart device, a portable gaming device, wireless location determination device, etc., of a user that performs mobile communication and data communication. The file distribution system 1120 may be a server that provides the installation file 1130.

For example, the file distribution system 1120 may include an installation file manager 1121 configured to store and manage the installation file 1130 and an installation file transmitter 1122 configured to transmit the installation file 1130 to the wireless location service apparatus 1110 in response to a request from the wireless location service apparatus 1110. For example, the file distribution system 1120 may be an application store that receives registration of the installation file 1130 for providing the application to the wireless location service apparatus 1110 from at least one application provider or developer.

The wireless location service apparatus 1110 may install the application through the installation file 1130 received from the file distribution system 1120, and may perform a wireless location service providing method according to some example embodiments based on the installed application.

For example, the application may control the mobile terminal to determine a current location of the user based on at least one of a virtual point positioned in a space in which beacon transceivers are provided and a beacon transceiver having transmitted a beacon signal, and to receive a location based service based on the determined current location of the user.

Also, the application may control the mobile terminal to display a detailed travel route of the user according to a direction change of the user on a map of an environment, such as an indoor facility map, in response to sensing the direction change of the user using a gyro sensor provided to the mobile terminal of the user. Here, the application may control the mobile terminal to rotate and thereby display the indoor map along the changed direction.

Also, the application may control the mobile terminal to determine candidate beacon signals based on strengths of beacon signals collected from beacon transceivers. The application may control the mobile terminal to determine whether the current location of the user corresponds to the vertical point based on strengths of candidate beacon signals and desired and/or preset reference difference values 1 and 2. Here, when the current location of the user corresponds to the virtual point, the application may control the mobile terminal to determine location coordinates corresponding to the virtual point as the current location of the user. Conversely, when the current location of the user does not correspond to the virtual point, the application may control the mobile terminal to determine the current location of the user based on location coordinates of a beacon transceiver corresponding to a beacon signal having a greatest strength among candidate beacon signals.

The application may control the mobile terminal to provide a location based service based on the determined current location of the user. Here, the application may control the mobile terminal to guide not only the current location of the user but also the detailed travel route of the user.

In addition, the application may control the mobile terminal to provide a mobile payment service, a BLE, NFC communications, infrared (IR)_communications, RFID, other radio frequency communications, etc. location based service such as a guidance at an exhibition, etc.

Although an example of using a mobile terminal for a wireless location service apparatus is described, a server that provides a location based service to the mobile terminal may be used for the wireless location service apparatus. It will be described with reference to FIG. 12.

While only one wireless location service apparatus 1110, installation file 1130, and file distribution system 1120 are depicted in the FIG. 11, the example embodiments are not limited thereto, and any number of wireless location service apparatuses, installation files, and file distribution systems may be present in various example embodiments.

Figure 12:
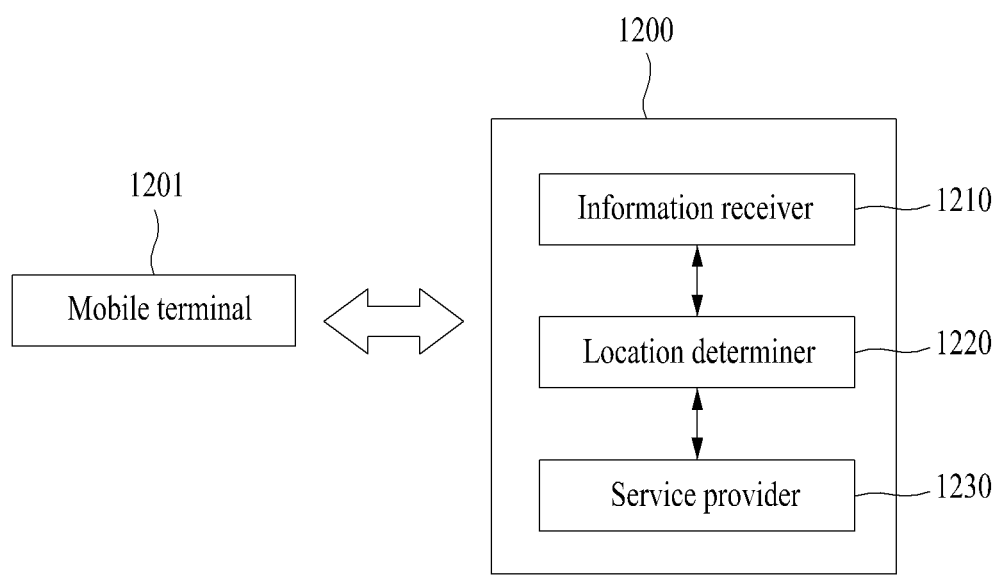
FIG. 12 is a block diagram illustrating another example of a configuration of a wireless location service apparatus according to at least one example embodiment.

FIG. 12 is a block diagram illustrating another example of a configuration of a wireless location service apparatus according to some example embodiments. The wireless location service apparatus 1200 may include an information receiver 1210, a location determiner 1220, and a service provider 1230.

When a mobile terminal 1201 downloads and installs an application from a server to utilize a location based service, and then executes the application, the information receiver 1210 may receive a beacon signal collected at the mobile terminal 1201 through the application.

The location determiner 1220 may determine a current location of a user based on the received beacon signal. An operation of the location determiner 1220 that determines the current location of the user is substantially the same as an operation of the location determiner 412 of FIG. 4 and thus, a further description will be omitted here.

The service provider 1230 may provide a location based service to the mobile terminal 1201 based on the determined current location of the user. The service provider 1230 may provide the location based service to the mobile terminal 1201 through an interface formed between the wireless location service apparatus 1200 and the mobile terminal 1201, in response to the mobile terminal 1201 executing the application. For example, the service provider 1230 may provide a location based service for displaying the current location of the user on the mobile terminal 1201, providing a guide to a destination based on the current location of the user, or providing information about a point of interest around the current location of the user.

The methods according to example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing greater level code that may be executed by the computer using an interpreter. The described hardware devices may be to act as one or more software modules in order to perform the operations of the above-described embodiments.

While only one wireless location service apparatus 1200, mobile terminal 1201, information receiver 1210, a location determiner 1220, and a service provider 1230 are depicted in the FIG. 12, the example embodiments are not limited thereto, and any number of wireless location service apparatuses, mobile terminals, information receivers, location determiners, and service providers may be present in various example embodiments.

It will be apparent to those skilled in the art that various modifications and variation can be made in the example embodiments without departing from the spirit or scope of the invention. Thus, it is intended that the example embodiments cover the modifications and variations of this invention provided they come within the scope of the appended claims and their equivalents.

What is claimed is:

1. A wireless location service apparatus comprising:
a memory having computer readable instructions stored thereon; and
at least one processor configured to execute the computer readable instructions to,
receive a plurality of beacon signals collected from each of a plurality of beacon transceivers positioned around a user through an application installed on a mobile terminal of the user,
determine a current location of the user based on at least one of a virtual point and the plurality of beacon signals, the virtual point positioned in a space in which the beacon transceivers are provided, the determining the current location of the user including,
determining, a signal strength of each of the plurality of received beacon signals, the plurality of received beacon signals including at least a first beacon signal associated with a first beacon transceiver and a second beacon signal associated with a second beacon transceiver,
calculating a difference in the signal strengths of the first beacon signal and the second beacon signal, and
determining the current location of the user as a first virtual point positioned between the first beacon transceiver and the second beacon transceiver in response to the calculated difference in the signal strengths being below a desired threshold signal strength value, and
provide, to the mobile terminal of the user, a location based service based on the determined current location of the user.

2. A system for providing wireless location services comprising:
at least one mobile terminal including at least one processor, the at least one mobile terminal configured to collect a plurality of wireless beacon signals and transmit the collected plurality of wireless beacon signals to at least one server;
at least two wireless beacons each including a transceiver, and each configured to transmit a wireless beacon signal, each of the wireless beacon signals including a unique beacon identifier and location information associated with the respective wireless beacons, the at least two wireless beacons including a first wireless beacon and a second wireless beacon; and
the at least one server configured to,
store at least one virtual point of an environment in a storage device, each of the at least one virtual point being virtually located between at least two wireless beacons of the at least two wireless beacons, each virtual point including location information associated with the respective virtual point, and
determine a current location of the at least one mobile terminal based on the location information of the at least one of the collected wireless beacon signals and the at least one virtual point, the determining the current location of the at least one mobile terminal including,
  determining a signal strength of each of the plurality of collected beacon signals, the plurality of collected beacon signals including at least a first beacon signal associated with the first wireless beacon and a second beacon signal associated with the second wireless beacon,
  calculating a difference in the signal strengths of the first beacon signal and the second beacon signal, and
  determining the current location of the at least one mobile terminal as a first virtual point positioned between the first wireless beacon and the second wireless beacon in response to the calculated difference in the signal strengths being below a desired threshold signal strength value.

3. The system of claim 2, wherein the at least one server is further configured to:
  provide to the at least one mobile terminal at least one location based service associated with the determined current location of the at least one mobile terminal, the at least one location based service including at least one of a mobile payment service, a map service, a path guide, a routing service, or a messaging service.

4. The system of claim 2, wherein the at least one server is one of the at least one mobile terminals.

5. The system of claim 2, wherein the at least two wireless beacons and the at least one virtual point are located indoors.

6. The system of claim 2, wherein the determination of the current location of the at least one mobile terminal further comprises:
  determining at least one candidate beacon signal based on signal strengths of the collected wireless beacon signals and a comparison of the strengths of the collected wireless beacon signals with a candidate beacon threshold value; and
  associating the current location of the at least one mobile terminal with the location information of the respective wireless beacon of the at least one candidate beacon signal or a virtual point of the at least one virtual point arranged proximately to the at least one wireless beacon associated with the candidate beacon signals based on results of a comparison of the at least one candidate beacon signal with a reference value.

7. The system of claim 2, wherein the determining the current location of the at least one mobile terminal further includes:
  calculating a first distance between the at least one mobile terminal and the first wireless beacon based on the signal strength of the first wireless beacon signal;
  calculating a second distance between the at least one mobile terminal and the second wireless beacon based on the signal strength of the second wireless beacon signal; and
  determining the current location of the at least one mobile terminal based on the calculated first distance and the calculated second distance in response to the calculated difference in the signal strengths being greater than the desired threshold signal strength value.

8. The system of claim 2, wherein the at least one server is further configured to:
  receive gyro sensor data from the at least one mobile terminal; and
  store a travel route of the at least one mobile terminal based on the received gyro sensor data and a history of the determined current location of the at least one mobile terminal.

9. The system of claim 2, wherein the at least two wireless beacons and the at least one virtual point are located outdoors.

10. The system of claim 2, wherein
  the first wireless beacon and the second wireless beacon are located at different vertical heights; and
  the determining the current location of the at least one mobile terminal includes determining a vertical height of the at least one mobile terminal.

11. The wireless location service apparatus of claim 1, wherein the at least one processor is further configured to:
  provide to the mobile terminal of the user at least one location based service associated with the determined current location of the mobile terminal, the at least one location based service including at least one of a mobile payment service, a map service, a path guide, a routing service, or a messaging service.

12. The wireless location service apparatus of claim 1, wherein the wireless location service apparatus is a second mobile terminal.

13. The wireless location service apparatus of claim 1, wherein the first beacon transceiver, the second beacon transceiver, and the first virtual point are located indoors.

14. The wireless location service apparatus of claim 1, wherein the first beacon transceiver, the second beacon transceiver, and the first virtual point are located outdoors.

15. The wireless location service apparatus of claim 1, wherein the determining the current location of the user further comprises:
  determining at least one candidate beacon signal based on signal strengths of the collected wireless beacon signals and a comparison of the strengths of the collected wireless beacon signals with a candidate beacon threshold value; and
  associating the current location of the user with the location information of the respective wireless beacon of the at least one candidate beacon signal or a virtual point arranged proximately to wireless beacons associated with the candidate beacon signals based on results of a comparison of the at least one candidate beacon signal with a reference value.

16. The wireless location service apparatus of claim 1, wherein the determining the current location of the user further comprises:
  calculating a first distance between the mobile terminal of the user and the first beacon transceiver based on the signal strength of the first beacon signal;
  calculating a second distance between the mobile terminal of the user and the second beacon transceiver based on the signal strength of the second beacon signal; and
  determining the current location of the user based on the calculated first distance and the calculated second distance in response to the calculated difference in the signal strengths being greater than the desired threshold signal strength value.

17. The wireless location service apparatus of claim 1, wherein the at least one processor is further configured to:
  receive gyro sensor data from the mobile terminal of the user; and
  store a travel route of the mobile terminal of the user based on the received gyro sensor data and a history of the determined current location of the user.

18. The wireless location service apparatus of claim 1, wherein
- the first beacon transceiver and the second beacon transceiver are located at different vertical heights; and
- the determining the current location of the user includes determining a vertical height of the user.

\* \* \* \* \*